Feb. 14, 1967　　　　　　H. E. ADAMS　　　　　　3,304,006
SYSTEM FOR HANDLING FLUIDS IN BOTH LIQUID AND GASEOUS PHASES
Original Filed April 24, 1963　　　　　　　　　　　7 Sheets-Sheet 1

INVENTOR.
HAROLD E. ADAMS
BY
Nolte & Nolte
ATTORNEYS

United States Patent Office 3,304,006
Patented Feb. 14, 1967

3,304,006
SYSTEM FOR HANDLING FLUIDS IN BOTH
LIQUID AND GASEOUS PHASES
Harold E. Adams, Norwalk, Conn., assignor to The Nash
Engineering Company, South Norwalk, Conn., a corporation of Connecticut
Continuation of application Ser. No. 275,459, Apr. 24, 1963. This application Aug. 13, 1965, Ser. No. 483,007
29 Claims. (Cl. 237—67)

This application is a continuation of copending application Serial No. 275,459, filed April 24, 1963.

The present invention relates to systems for handling fluids in both liquid and gaseous phases.

At the present time installations which are required to handle both liquids and gases are extremely and undesirably complex because of the extensive and varied structure required for handling both gases and liquids as well as because of the many complex controls required by such installations. Moreover, there are applications where it is highly desirable to be able to use systems capable of handling both liquids and gases but where such systems are not used because of the complications inherent in such systems.

For example, in comfort heating installations it is highly desirable to be able to use steam for the heating medium, but because of the complications involved in handling both the liquid condensate and the additional fluids in the form of gases and vapors it is more common to use hot water as a heating medium rather than steam, in spite of the known advantages which are to be derived from the use of steam. Also, in various commercial installations which use steam for heating purposes in many industrial applications it is necessary to provide a complex array of apparatus involving different types of pumps, motors, complex valves, and the like, which render such systems extremely expensive and difficult to maintain economically.

It is therefore a primary object of the present invention to provide a structure which will make the handling of fluids in both the liquid and gaseous phases extremely convenient, simple, and inexpensive.

A further object of the present invention is to provide for systems required to handle both liquids and gases a single pump which can operate efficiently while pumping both liquids and gases.

It is furthermore an object of the present invention to provide a structure which will deliver a steady, continuous flow of both liquid and gas to such a pump.

An additional object of the present invention is to provide a structure for the above type of system for delivering to a single pump both gas and liquid in such a way that these different and distinct fluid phases will in no way interfere with each other.

Also, it is an object of the present invention to provide a system of the above type which is capable of operating efficiently under all conditions which are likely to be encountered in practice.

Another object of the invention is to provide a simplified steam heating system not requiring the usual condensate receiver and liquid level float controls associated therewith.

The objects of the present invention also include the provision of such a system which is particularly adapted for comfort heating.

Furthermore, the objects of the present invention include the provision of a system of the above type which is particularly adapted for any commercial installation requiring the use of a heat exchanger which necessitates the handling of fluids in both the liquid and gaseous phases.

Primarily, the present invention includes a multiphase type pump capable of pumping fluids in both the liquid and gaseous phases and having a single inlet and a pair of outlets through which liquids and gases are respectively discharged from the pump means. A main conduit means communicates with the inlet of the pump means for directing both gas and liquid toward the pump means, and an orifice means is carried by this main conduit means for building up a head of liquid in the main conduit means on the upstream side of the orifice means, with respect to the inlet of the pump means, so that there will be a substantially continuous flow of liquid through the orifice means toward the inlet of the pump means. A bypass conduit means communicates with the main conduit means upstream of the orifice means for receiving gases from the main conduit means, and this bypass conduit means also communicates with the inlet of the pump means for delivering gases thereto, so that with this arrangement of the present invention there will be a continuous flow of gas and liquids to the inlet of the multiphase pump means, automatically eliminating all of the disadvantages which would result from an interrupted flow of liquid to the pump means, as well as the expense of a conventional condensate receiver as employed in heating systems not using applicant's multiphase type pump.

The invention is described in detail below in connection with the drawings which accompany and form part of this application and, in which.

Figures 1, 2:
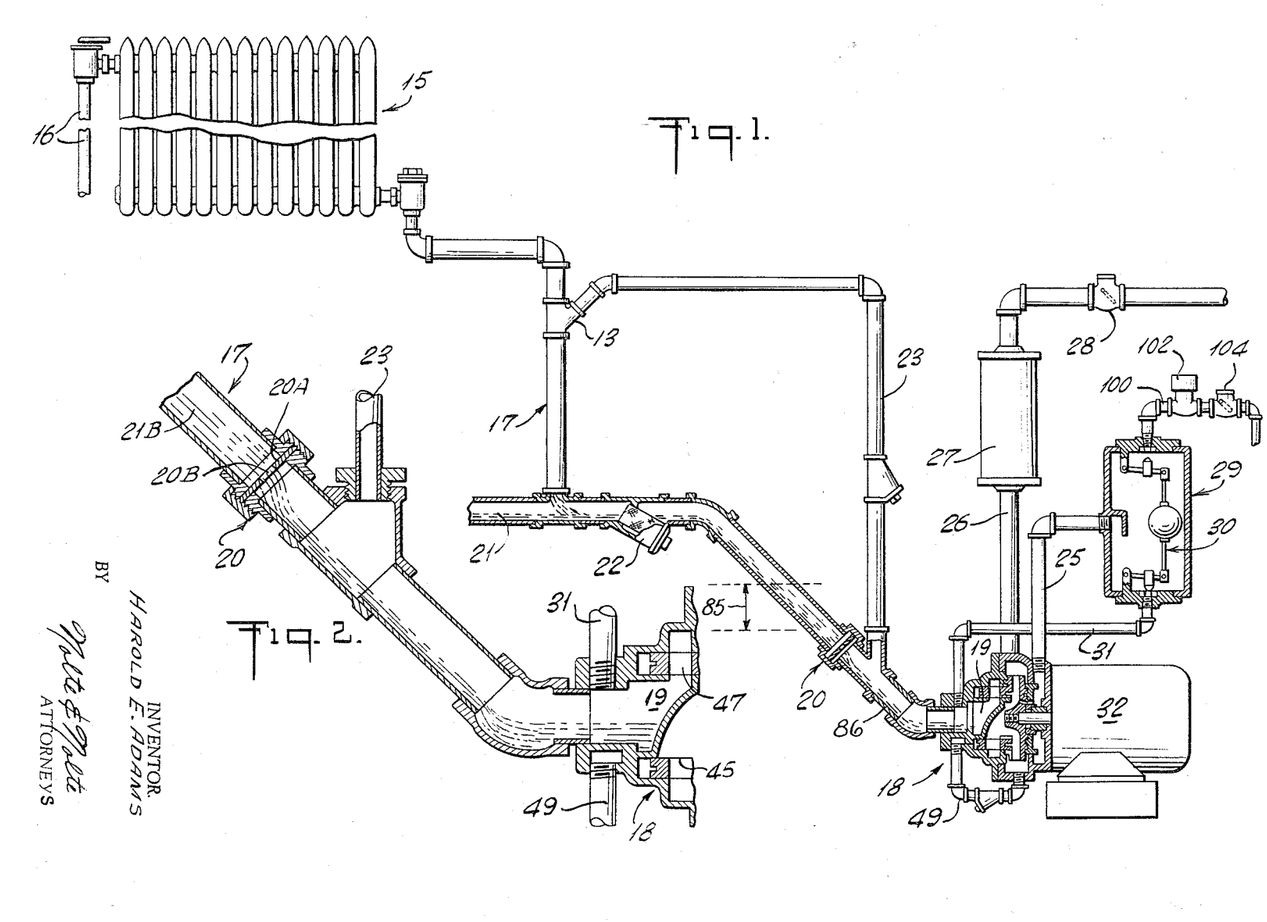
FIG. 1 is a partly sectional, fragmentary illustration of one possible embodiment of a structure according to the present invention, this structure being shown in FIG. 1 as it is applied to a comfort heating system.
FIG. 2 shows on an enlarged scale that part of the structure of FIG. 1 which includes the orifice means of the invention and which communicates with the inlet of the pump means.

Referring to FIG. 1, where one embodiment is shown as applied to a comfort system, there is shown in FIG. 1 a heating unit 15 which is illustrated as a conventional radiator, although any other heating unit through which steam is adapted to flow may be used with the structure of the invention. Steam is supplied to the heating unit 15 through the supply conduit 16 which derives its steam from any suitable source such as a boiler (not shown), for example. After passing through the heating unit 15, the liquid condensate and the remaining gases in the form of steam and/or air flow into the main conduit means 17 which thus contains the fluids in both the liquid and gaseous phases. This main conduit means directs the fluids to a pump means 18 of the invention which is a multiphase type pump means capable of pumping fluids in the liquid and gaseous phases. The main conduit means 17 communicates with the single inlet 19 of the pump means 18 so that the gases and liquids both enter into the pump means 18 through its single inlet 19. Details of the pump means 18 are described below.

In accordance with the invention an orifice means 20 is located in the main conduit means 17. As is apparent particularly from FIG. 2, the orifice means 20 is in the form of a plate 20A carried by the main conduit means 17 and extending across the interior thereof, this plate being formed with a central aperture 20B which of course greatly reduces the cross section of the main conduit means 17. As a result the orifice means 20 builds up a substantial head of liquid 85 on the upstream side of the orifice means 20 with respect to the inlet 19 of the pump means 18. As may be seen from FIG. 1, the static head 21 available to produce flow in a conduit which is only partially filled with liquid is relatively small, and because of its free surface this flow would be subject to wave motion and instability due to any slight disturbance. However, because of the presence of the orifice means 20, the liquid is held back until it builds up a sufficient static head on 21B to produce a steady full stream flow thru this orifice with this steadied flow directed toward the pump means to enter by this acquired velocity into the pump inlet 19 thereof. There is shown also, in FIG. 1, a conventional strainer 22 employed to filter undesirable solid substances out of the liquid.

The structure of the invention includes a bypass conduit means 23 which, as is shown in FIG. 1, communicates with the main conduit means 17 at junction 13 which is located upstream and above the orifice means 20. Therefore, the gases which cannot pass through the orifice means 20 because of the head of liquid 85 located at the upstream side thereof are received in the bypass conduit means 23, which also communicates with inlet 19 of pump 18 so as to deliver the gases thereto. In the illustrated example, the bypass conduit means 23 communicates with the inlet 19 through portion 86 of the main conduit means 17 which is located downstream of the orifice means 20.

As will be apparent from the description below, the multiphase pump means 18 has a pair of outlets one of which is a liquid outlet for discharging liquid and the other of which is a gas outlet for discharging gases, the liquids bieng pumped and the gases being centrifugally separated by the right hand impeller portion of the pump means 18 and delivered to the separate outlets thereof, respectively. A detailed explanation of the operation of the pump means 18 will be obtained in connection with the description of FIGS. 3 and 4 herebelow. The gases discharge through a conduit 25 which communicates with the gas outlet and the liquids discharge through a conduit 26 which communicates with the liquid outlet of the pump means 18. This liquid flows, for example, through a storage chamber 27 and through a check valve 28, and then the liquid is delivered back to a suitable boiler or the like to be reheated before again being delivered to the various heating units 15. Storage chamber 27 serves to retain a liquid supply for pump 18 allowing said pump to continuously operate to remove gas from the main conduit means 17 even in the absence of any returning liquid therein. The gases, which flow through the conduit 25, are received in a separator means 29 which houses a double float-valve unit 30, and are discharged via a conduit 100 which includes a thermostatically controlled vent valve 102 and check valve 104. Vent valve 102 remains open until steam vapor flows through it and then automatically closes, remaining closed until the temperature drops, after condensing of the steam adjacent said valve. Any additional condensate in the discharged gases will collect in the separator means 29, and when the level of the condensate in the separator means 29 is sufficiently high it will actuate the double-float valve unit 30 so as to open the return conduit 31 through which the condensate is returned back to the inlet 19 of the pump means 18.

It will be seen that with the structure of the invention the provision of the metering orifice means 20 serves to equalize or average out the liquid flow and to direct a monitored flow of liquid into the inlet 19 of the pump means 18. The bypass conduit means 23 provides an unobstructed vapor path between the pump 18 and the main conduit means 17 around the condensate head above the orifice means 20, so that the necessary vacuum required therein may be maintained by the pump. The pump means is driven at a constant speed by a motor 32. Thus, there is provided a stabilized and organized flow of the separate gas and liquid components into the pump inlet plus a means for externally providing sufficient velocity to the relatively slow moving liquid so as to direct this liquid into the rotor of the pump. With the particular arrangement shown in FIGS. 1 and 2, the inclination of the portion of the conduit means 17 which includes the orifice means 20 maintains a relatively high speed in the flow of the liquid to the pump means while in the embodiments described below the orifice means actually injects the liquid at a relatively high rate of speed directly into the inlet of the pump means.

This provision for injecting the liquid is additionally of advantage, beyond the above-discussed benefits of smoothing and averaging out the liquid flow. The flow of liquid is usually dependent upon gravity forces, and because of expandable gas or vapor in the main conduit means the pump suction displacement does not directly induce the liquids to flow. The gas or vapor content of the main conduit means readily expands to enter the pump inlet ports and this takes place in an orderly and predictable manner. The gas and vapor enters the pump at a high velocity induced by the pump suction displacement and the gas expansion. This suction displacement and pressure difference is not available, ordinarily, for accelerating or giving velocity to the liquid phase of the fluid. Therefore, if the liquid were not controlled it would enter the pump at slow and unpredictable velocities and amounts. The uneven effect of slugs of liquid entering the pump inlet is extremely undesirable because of the shocks resulting from the sudden excessive load to which the pump would be subjected under these conditions. Furthermore, uncontrolled delivery of slugs of liquid to the pump inlet would result in arrival of the liquid usually at very little velocity, as a result of the low velocity head 21 in a partially filled conduit, as mentioned above. The liquid is therefore required, under these conditions, to be immediately accelerated by the direct impact of the blades of the rotor of the pump, as the liquid enters the buckets of the rotor. This sudden acceleration of the liquid would cause shock and entrance losses which would be detrimental to the performance of the pump. By holding the liquid back in the main suction conduit 17 with the orifice means of the invention until a sufficient head has built up at the upstream side of the orifice means, the liquid is provided with the desired velocity for entry into the pump, and in this way the extreme entrance losses referred to above are eliminated.

An additional advantage of the orifice means is that it averages out any pulsations of the liquid flow to a rate which is commensurate with the average flow. Thus, the orifice means tends to steady the flow and to isolate flow surges from the pump. The average variation in flow is obtained by variations in the static head of liquid 21B on the upstream side of the orifice. The gas and vapor connection provided by the bypass conduit means 23 to the pump inlet passes around the orifice means with the upstream end of the conduit means 23 located at a point higher than the orifice means. Thus the bypass conduit means has the effect of equalizing the suction pressure of the pump on both sides of the orifice means. In this way, variation in the suction pressure created by the pump has no corresponding effect on the static head of liquid on the upstream side of the orifice means and thus does not upset the rate of flow of liquid through the orifice means. The flow of liquid through the orifice means to the pump is therefore modulated and controlled by the build up of the static or velocity head of liquid on the upstream side of the orifice means in accordance with the average flow of any slugs or surges in the liquid as it moves toward the pump. The basic suction created by the pump is transmitted back to the unit 15, or any other unit to which the structure of the invention is connected, by means of the bypass conduit means 23, and this reduced pressure is thus communicated without any upsetting influences which would otherwise occur as the result of slugs or variations in the liquid flow. When using steam as a heating medium it is at times, for comfort purposes, desirable to operate at less than atmospheric pressure. Thus, the temperature of the steam can be maintained sufficiently low for comfort heating purposes, and the structure of the invention enables this result to be accomplished in a simple and efficient manner, as compared to conventional systems which require far more complex structure for this purpose.

It should furthermore be noted that in the event that the entire system should become flooded as when being started up or for any other reason, then the bypass conduit means 23 will also become flooded, so that it will in this event serve as an emergency and auxiliary liquid removal line, delivering liquid directly to the pump. Under these conditions, the pump of the invention is capable of removing liquid from both of the conduit means at a rate which is three to four times the normal rate of liquid flow.

Figure 3:
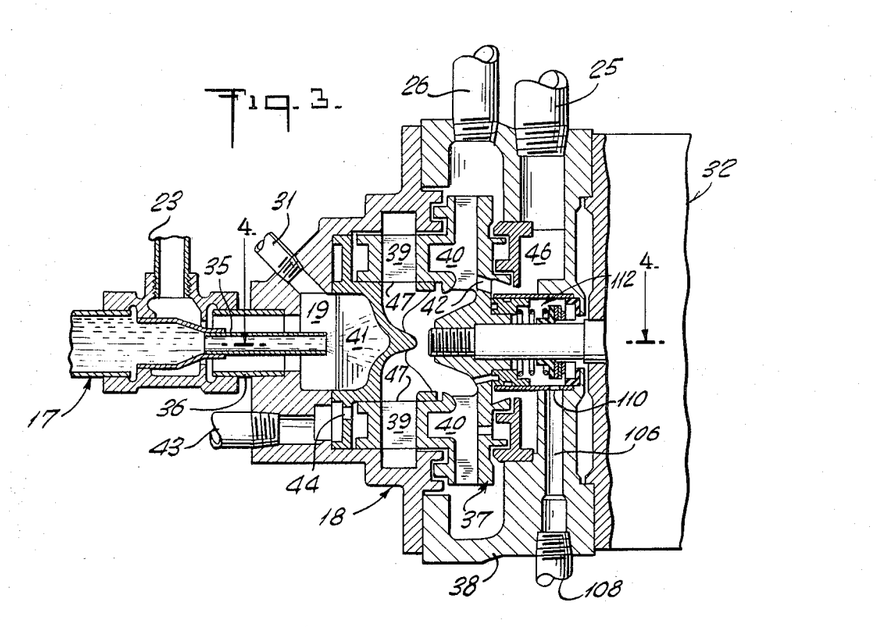
FIG. 3 is a sectional elevation showing the details of a pump means according to the invention as well as a manner in which fluids in the liquid and gaseous phases are delivered to this pump means.
Figure 4:
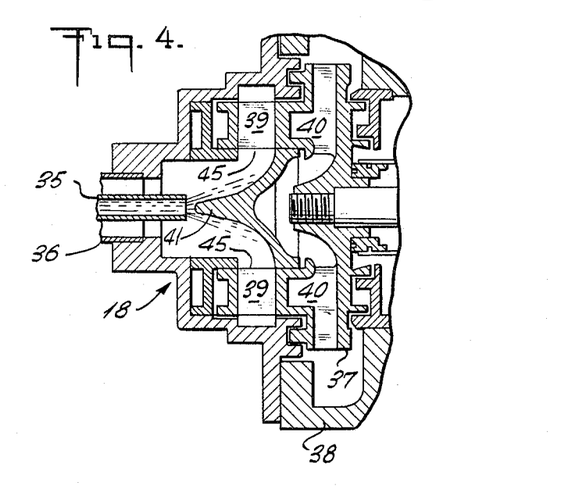
FIG. 4 is a fragmentary sectional view of the structure of FIG. 3 taken along line 4—4 of FIG. 3 in the direction of the arrows.

Referring to FIGS. 3 and 4, the conduit system of this embodiment differs from that of FIGS. 1 and 2 only in that the orifice means takes the form of an elongated inner tubular portion 35 which is of a smaller diameter than the remainder of the main conduit means 17 so that in this way there is built up on the upstream side of the orifice means 35 a head of liquid, as described above, and this liquid is injected from the elongated tubular orifice means 35 directly into the inlet 19 of the pump means 18. The bypass conduit means 23 of this embodiment includes an elongated tubular portion 36 which coaxially surrounds the tubular portion 35, so that the tubular portion 36 forms an outer elongated tubular portion surrounding the inner tubular portion 35 and also communicates with the inlet 19 of the pump means 18. The pump means includes a rotor 37 driven directly from the motor 32 and this rotor 37 is supported for rotation within the pump housing 38, this pump housing 38 forming a volute liquid outlet leading to the conduit 26. The rotor 37 has a liquid ring vapor compressor first stage 39 and a centrifugal impeller second stage 40. The liquid which issues from the orifice means 35 engages a stationary deflector 41 carried by the pump housing 38, and as may be seen from FIGS. 3 and 4, the deflector 41 divides the liquids into relatively thin layers which simultaneously enter through the inlet ports 45 shown in FIG. 4 to be received by the bladed pumping chambers of the liquid ring first-stage 39. The cross sectional view taken in FIG. 4 shows the inlet ports 45. A different cross sectional view is taken in FIG. 3 to show outlet ports 47. Both ports 45 and 47 border the inner periphery of the liquid ring vapor compressor first stage, the operation of which is well known in the art. The liquid and the compressed vapors and gases are delivered to the second-stage impeller 40 which serves to centrifugally separate the liquid and the gas, the gas passing through the bores 42 into the gas discharge chamber 46 located to the rear of the rotor 37, and from the chamber 46 the gas will discharge, for example, through the conduit 25, as described above. A fuller understanding of the operation of a pump of the above general type may be obtained by reference to applicant's copending patent application Serial No. 170,673, filed February 2, 1962, now Patent No. 3,213,794. The bottom of the housing 38 includes a passageway 106 to direct coolant fluid from a conduit 108 through an aperture 110 to the shaft seal 112. Also, a conduit 43 is provided for directing part of the liquid discharged from the pump back into the pump through inlets such as the bores 44, one of which is shown in FIG. 3. The liquid which is returned to the pump in this manner passes around the outer periphery of the first stage 39 to act as a seal for the rotor first stage 39, the sealing liquid being pumped in the same way as the liquid received from the main conduit means 17.

Figures 13, 14:
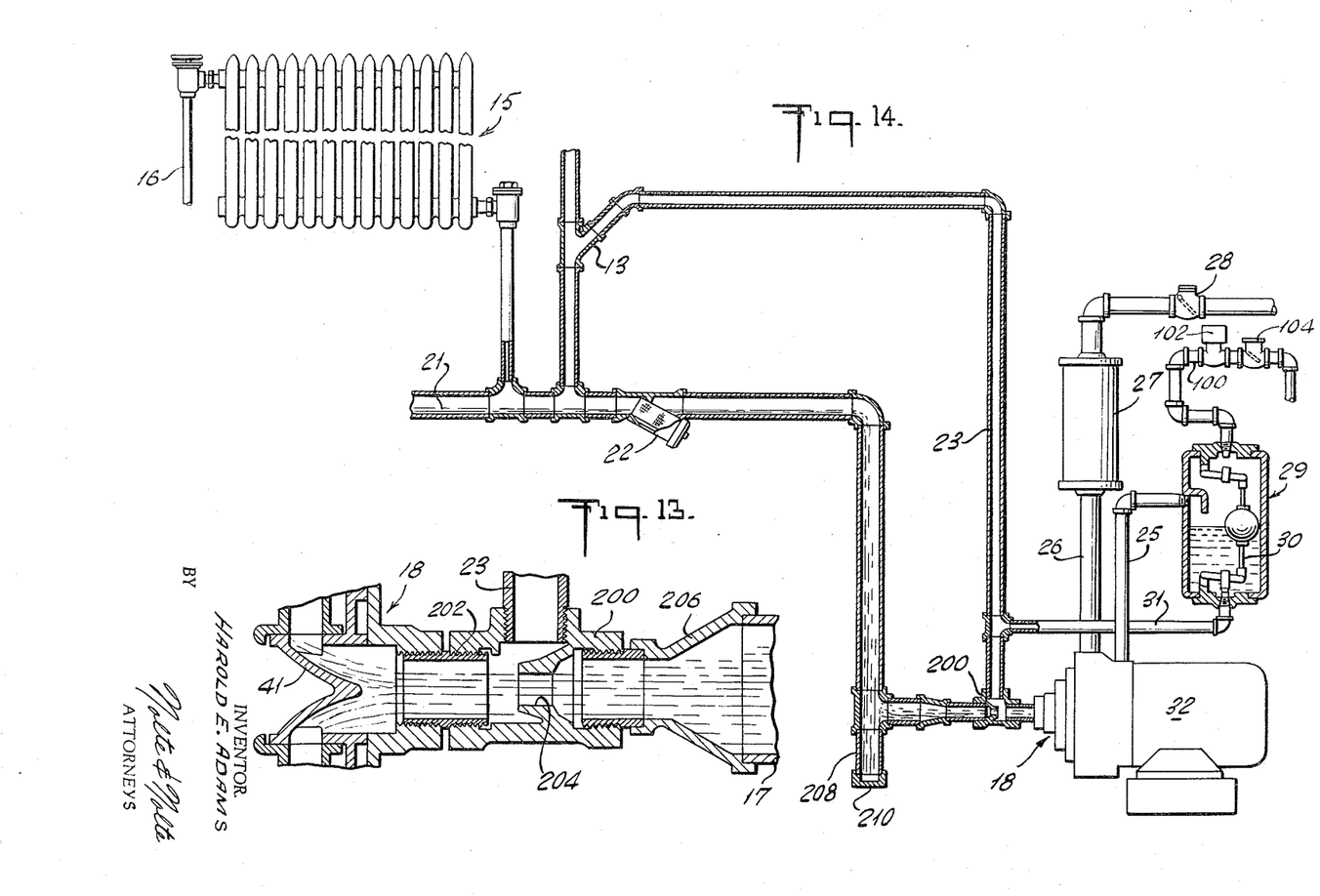
FIG. 13 is a fragmentary sectional view of still another and preferred embodiment of a low cost structure for directing fluids in the gaseous and liquid phases into the inlet of the pump means.
FIG. 14 is a representative system similar to FIG. 1 showing the way in which the structure of FIG. 13 may be employed.

While the orifice 35 provides optimized introduction of the liquid at low flow rates into the pump inlet, considerable cost savings may be obtained by employing a simple orifice plate, similar to plate 20 in FIG. 1, in place thereof or the flow fitting 200 of FIG. 14.

The centrifugally operated pump of the invention can handle separately, or in variable mixtures, gas, vapor and/or liquids, at self-adjusting displacement rates. In the specification and the claims which follow, all references made to gas or the gaseous phase of the fluid are intended to include not only dry gas but also vapors. The pump of the present invention, while different from a fixed positive displacement pump, nevertheless does have a semi-positive displacement. It is capable of pumping over a wide fluid density range which would be impossible with a centrifugal pump alone or a liquid ring pump alone. The pump of the invention is operated at a constant speed, and its volumetric pumping rate for a gas or vapor may be from six to ten or more times its normal pumping rate. Also, its liquid pumping rate will vary over a wide range which is, however, reduced as compared to its gas pumping rate. The pump of the invention is capable of pumping liquid exclusively without any damage to the pump and mixed fluid pumping rates will vary with the percentage of liquid to gas in the fluid mixture which is pumped. Thus, the pump of the invention is capable of providing many advantages over conventional installations. For example, in current practice, a centrifugal liquid pump must be protected on its suction side to insure that liquid covers its inlet at all times. The presence of any gas or vapors at the inlet of such a centrifugal pump would result in breakdown of its pumping action. Of course, the same centrifugal liquid pump is incapable of pumping a gas or a vapor alone. Condensate receiving tanks, generally provided with start-stop float switch controls, are practically mandatory on centrifugal pump drainage applications. Positive displacement pumps, if designed and applied for pumping liquid, must be provided with relief valves or other devices to prevent breakage of the pump if the discharge valve should be closed, and of course there are many other difficulties involved with such pumps. A positive type pump applied to a liquid drainage application, as distinguished from a centrifugal pump, will pump a small amount of gas or vapor that might be received in its inlet, but the rate of gas removal of such pump will never be greater than the basic displacement rate for liquids. This rate would never be useful on a normal drainage system since the gas and vapor volumes to be removed from such systems are considerably greater than the liquid volume. When such a positive displacement pump is operated at a speed suitable to give a reasonable capacity for the purposes of handling a gas or vapor, if liquid should be received at the inlet of the pump, the shock of attempting to handle the dense liquid at the higher rate would seriously endanger either the pump or the structure which drives the pump. Thus, the involved problem of handling mixed flow drainage is solved in an exteremely efficient manner with the present invention. It should be noted that a mixture of gas, vapor and liquid flowing in a pipe line is by its very nature not homogeneous either as to the mixture or as to its component flow characteristics. The incompressible liquid may be separated into droplets, slugs, or into a stratified flow pattern with the gas or vapor expanding to occupy the remainder of the space of the conduit. When such a mixture is presented at the pump inlet, the displacement action or the pumping effect of the pump reacts differently on the mixture than it would on a pipe completely filled with liquid. Where the pipe is completely filled with liquid, the pump suction displacement presents a lower pressure to the liquid than in the line and the presusre difference results in forcing the liquid into the pump interior at a rate commensurate with the pump capacity and the pressure difference created. If, however, the liquid in the pipe flows in a discontinuous, stratified, or mixed manner, mixed with a gas or vapor, then the gaseous components simply expand and flow to fill any free volume created by the pump, with a resulting reduction in the pressure in the conduit. The pressure difference created at the pump inlet, however, is transmitted all the way down the suction line, through the expanding gas medium and not through the discontinuous liquid. Therefore, this action will produce a flow of gas but not a flow of liquid. This is the type of problem encountered in installations requiring the handling of fluid in the gaseous and liquid phases. Usually the flow of liquid under these conditions is produced solely by gravity, only by grading or pitching the conduit downward to the pump inlet. Because of the relatively low velocity generated, and in order to take care of the larger volume of leakage or evolved gas or vapor, such drainage lines are larger in diameter than pressurized lines which are filled with liquid. Thus, with such installations, as mentioned above, it is conventional to deliver the liquid into a suitable tank and to separate the gases or vapors from the liquid. Such provisions are particularly necessary with centrifugal equipped pumps to present liquid alone to the inlet of the pump and to prevent air, gas or vapor from having access to the centrifugal pump inlet. These structures generally include a start-stop float switch mounted in the receiver for the liquid, thus the liquid removal is necessarily intermittent. The gases and vapors are then either vented to a lower pressure or are removed by an additional pump with a start-stop means provided to prevent the lowering of the gas or vapor pressure in the receiver to the point where the net positive suction head on the centrifugal pump would be too low for its operation. A twelve-foot net positive suction head is a usual limitation.

The particular pump of the present invention simplifies such installations considerably. Only the single pump is required, while the two pumps and the essential tank for receiving the liquid, with its associated float and pressure-protective controls, are all eliminated by the present invention. The system of this invention benefits from the steady, uniform removal service all the way up to the self-limiting vaporizing pressure of the liquid in the system or at the equivalent of zero net positive suction head at the pump inlet. The above-described conduit structure which includes the orifice means and bypass conduit means, results in maximum smoothness of operation when using the pump means 18 to pump fluid in both the liquid and gaseous phases. As mentioned hereinabove, under its normal rating the pump of this invention may have a relatively large capacity for gas or vapor of about eight or more units of volume to one unit of volume for liquid. This of course will depend upon the application and the design proportions of the pump. As the liquid content of the fluid increases, the amount of gas or vapor pump capacity is reduced and finally, if no gas or vapor is presented to the inlet, there is only a solid flow of liquid, and the pump means 18 will handle this liquid up to three or four units of volume. This result is brought about because of the two-stage centrifugal relationship of the pump rotor and without any damage to the pump or to the motor which drives the pump. This self-protecting and adapting displacement varies from about eight to ten volumes under normal operation to three or four volumes under flooded conditions, or generally about two to one.

As a result of the injection of the liquid from the orifice means 35, the liquid has the necessary velocity and inertia to inject itself into the rotor, and because of the deflector means 41, the liquid will be directed in an orderly and relatively thin film or stratum into the ports 45, as a result of the preselected curvative of the surface of the deflector 41. As a result, the portion of the ports 45 which are not occupied by the film of liquid is unobstructed by any liquid and is thus available for receiving a high velocity of flow of gas into the rotor without any further entrance losses.

Referring to FIG. 1, it will be seen that the liquid reaches the inlet 19 in a different manner from that of FIGS. 3 and 4, because it is simply flowing from the orifice means 20 down the inclined portion of the main conduit means 17, rather than being injected by an orifice means 35 as shown in FIGS. 3 and 4. FIG. 1 shows a bypass 49 extending from the volute discharge portion of the pump, to deliver part of the pumped liquid back into the pump to thereby seal the first stage of the rotor, as described above. The pipe 43 shown in FIG. 3 can receive liquid for this purpose in a different way, as described below.

Figure 5:
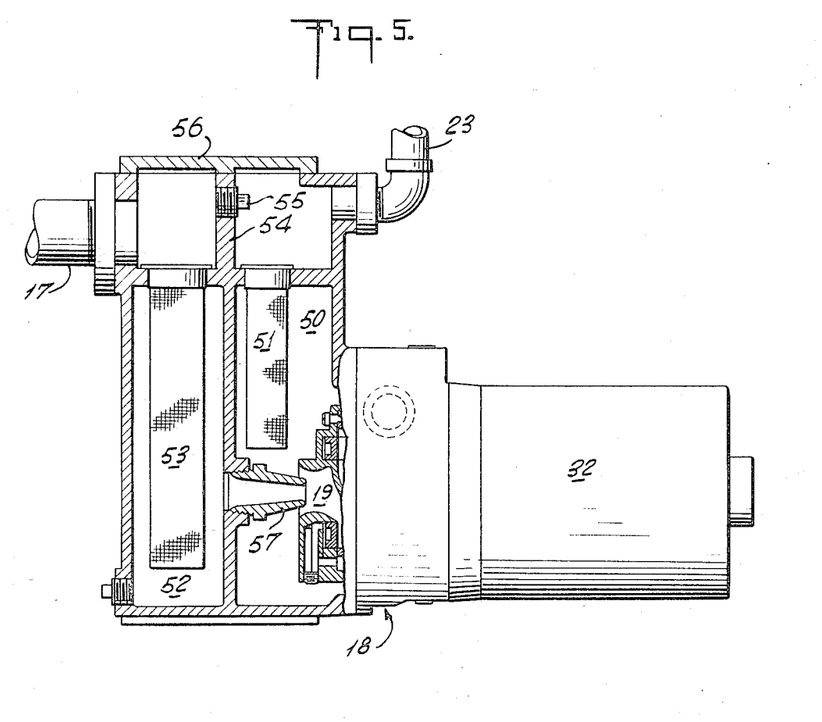
FIG. 5 is a partly sectional illustration of another embodiment of a structure for delivering fluid in liquid and gaseous phases to the pump means.

FIG. 5 illustrates another possible structure which may be used for delivering the liquid and gaseous phases of the fluid to the pump means 18. Thus, as may be seen from FIG. 5, the bypass conduit means 23 delivers the gas to a gas chamber 50, a suitable strainer 51 being provided. The liquid which discharges from the main conduit means 17 is received in a liquid chamber 52. It will be noted that the gas chamber 50 is located between the inlet 19 of the pump means 18 and the liquid chamber 52. This chamber is provided with a suitable strainer 53. In addition, the partition 54 between the gas and liquid chambers is provided with a plug 55 and a suitable removable cover 56 is provided so that when desired the strainers 51 and 53 can be removed. The liquid collected in the liquid chamber 52 will rise to an elevation above the opening in the partition which receives the nozzle 57, and this nozzle 57 which is shown in FIG. 5 forms the orifice means of this embodiment, the liquid building up to a substantial head on the upstream side of the orifice means 57 and being injected upon flowing through the latter into the inlet 19 of the pump means 18. Thus, the orifice means 57 passes from the liquid chamber 52 through the gas chamber 50 directly into the inlet 19 of the pump, and the gas will also enter into the inlet 19, the chamber 50 forming a conduit means at the downstream of the bypass 23 surrounding the end 57 of the conduit means 17 of this embodiment.

Figure 6:
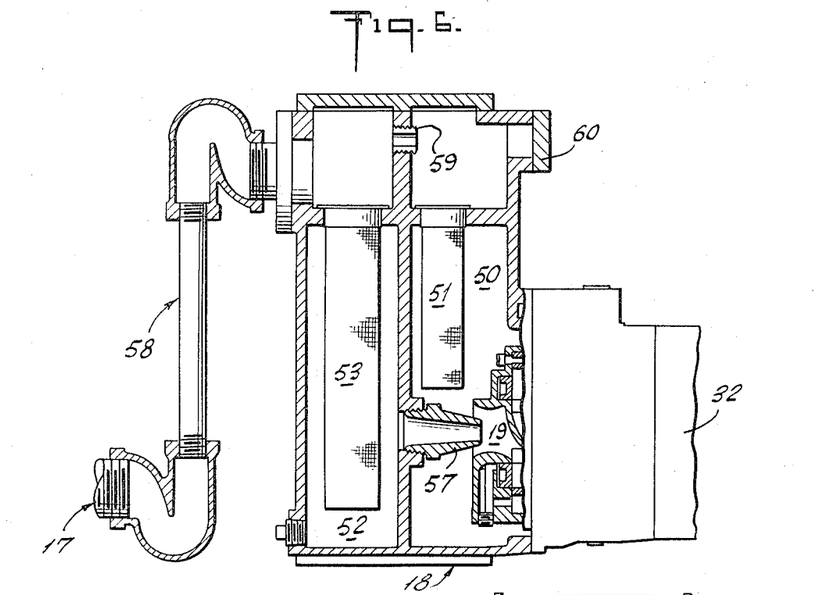
FIG. 6 is a partly sectional illustration showing how the structure of FIG. 5 can be adapted for use in installations where part of the conduit means leading thereto is lower than the inlet of the pump means.

Although it is always desirable to arrange the main conduit means so that it is located with all of its parts higher than the elevation of the pump, where this is not possible an arrangement such as that shown in FIG. 6 may be used, FIG. 6 showing how the structure of FIG. 5 may be modified for this purpose. Thus, in this case the main conduit means 17 has a lifting portion 58 provided with conventional lift fittings so that the gas in the conduit 17 will bubble up through the lifting portion 58 to raise liquid therewith, and thus both the liquid and the gas will in this case enter into the chamber 52. However, the lower part of the chamber will be filled with liquid to an elevation higher than the orifice means 57, and in the embodiment of FIG. 6 the plug 55 is replaced by a tubular fitting 59 through which the gas can enter into the gas chamber 50. With the embodiment of FIG. 6 the normal vapor connecting port of chamber 50 is closed by a suitable plate member 60, and in this case the chamber 50 in combination with the upper portion of chamber 52 forms the equivalent of the bypass conduit means 23 (FIG. 1) which communicates with the main conduit means 17 upstream of the orifice means 57 and which delivers the gas to the inlet of the pump, as illustrated in FIG. 6.

Figure 7:
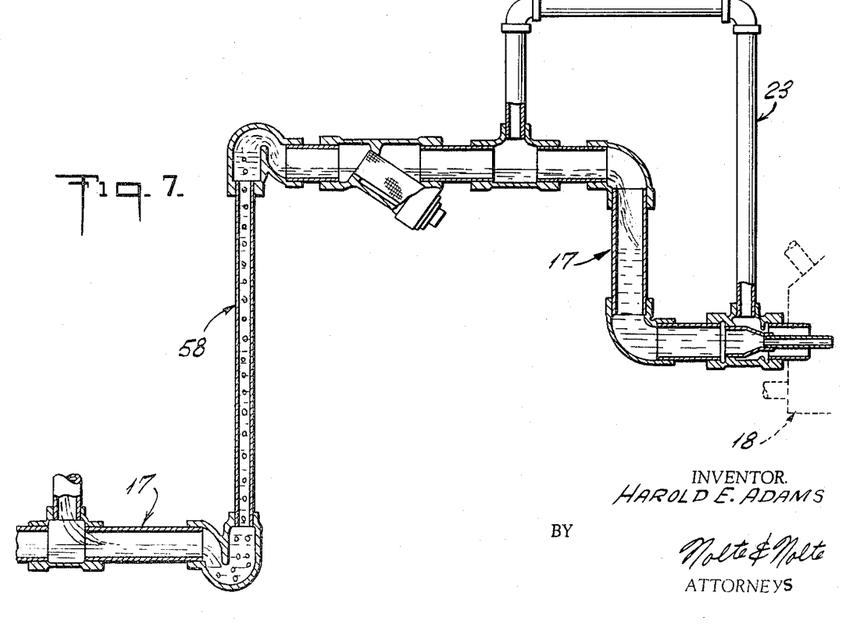
FIG. 7 also illustrates a conduit system of the invention for the situation where part of the conduit which leads the fluids to the pump is located at an elevation lower than the inlet of the pump.

Of course, the same expedient to take care of the case where the main conduit means has a portion at an elevation lower than the inlet of the pump may be resorted to for an installation using a pump such as that shown in FIG. 3. FIG. 7 illustrates how the main conduit means 17 may be provided with a lifting portion 58 for raising the liquid to an elevation higher than the inlet of the pump and delivering the gas and the liquid to the inlet of the pump in the manner shown in FIG. 3. As is apparent from FIG. 7, the bypass conduit means 23 will in this case communicate with the main conduit means 17 downstream of its lifting portion 58.

Figure 8:
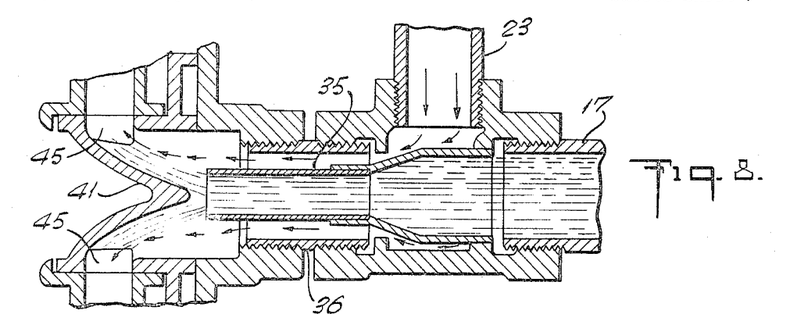
FIGS. 8–11 respectively illustrate, in section, different embodiments of structures for directing fluids in the gaseous and liquid phases to the inlet of the pump means.

FIG. 8 shows on an enlarged scale the manner in which the different phases of the fluids flow to the inlet of the pump with a structure of the type shown in FIGS. 3 and 4. Thus, the orifice means formed by the elongated inner tubular portion 35 builds up a head of liquid on the upstream side of the orifice means, and the liquid is injected in the manner shown in FIG. 8 to provide the relatively thin layers which flow along the surface of the deflector 41 into the first stage of the rotor. The gas entering through the bypass conduit means 23 flows through the space between the inner tubular portion 35 and the outer tubular portion 36 to surround the liquid and enter freely through the unobstructed portions of the ports which are not occupied by the liquid, as described above.

Figure 9:
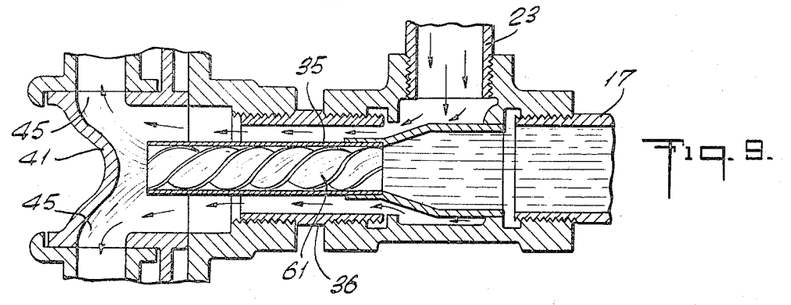

The operation may be enhanced by providing in the inner tubular portion 35 a helix means 61, as shown in FIG. 9, providing a spiral path of flow for the liquid so that it will enter helically into the inlet of the pump engaging the deflector 41 in the manner shown in FIG. 9.

Figure 10:
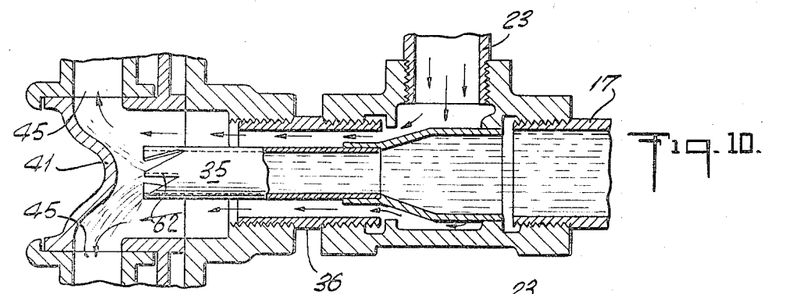

Similar results can be achieved by providing the downstream end of the inner tubular portion 35 with notches 62, as illustrated in FIG. 10, the configuration of these notches also providing a helical flow path for the liquid as it discharges into the inlet of the pump.

Figure 11:
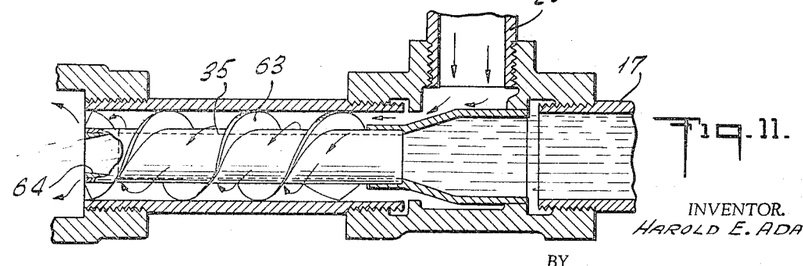

Furthermore, instead of providing the liquid with a helical path of flow a helix means 63 may be located between the inner and outer tubular portions, as indicated in FIG. 11, providing a spiral path of flow for the gaseous phase of the fluid. Also, FIG. 11 shows how the inner surface of the downstream end of the inner tubular portion may have a converging configuration, this inner surface 64 being frusto-conical, as indicated in FIG. 11, so that in this case the injected body of liquid will converge toward the deflector, and of course a similar operation is provided by the nozzle 57 shown in FIGS. 5 and 6.

In any event, each of the arrangements of FIGS. 9–11 is effective to employ the flow of either the gas or liquid to impart a preliminary rotary motion to the liquid prior to its introduction into the first stage 39. The rotary motion imparted to these fluids is in the same direction as the motion of the pump rotor. In this manner, less work is required of the first stage 39 to impart the necessary rotary motion of the liquid within the pump casing.

Figure 12:
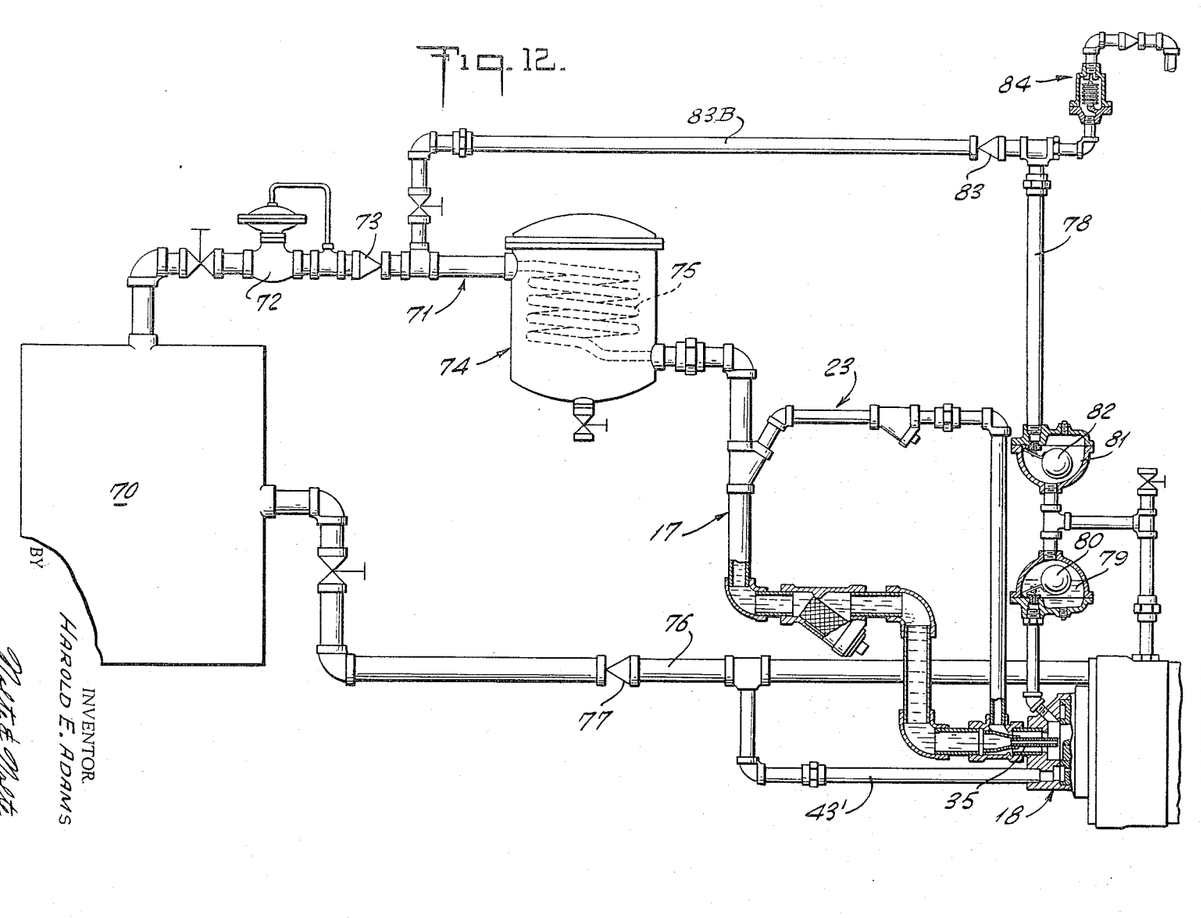
FIG. 12 is a diagrammatic illustration of a structure where the invention is applied to a commercial installation requiring the use of a heat exchanger, FIG. 12 also illustrating a feature of the invention according to which steam is automatically recirculated through the heat exchanger.

The invention is applicable to many commercial and industrial installations, and FIG. 12 shows how the invention can be used with installations where a heat exchanger is required, as in a steam-jacketed mold or in kettles, platens, cookers, dryers, laundry presses, and the like. Referring to FIG. 12, there is shown therein a boiler 70 which delivers steam to the supply conduit means 71, the steam flowing through a pressure reducing valve 72 and a check valve 73 to the heat exchanger 74 which is illustrated as a cooker or kettle with an internal steam heating coil 75, although the same principle is of course applicable to all similar apparatus such as platens, molds, dryers, laundry presses, and the like, as mentioned above. The gas and liquid discharging from the coil 75 flows along the main conduit means 17 to the multiphase pump means 18, and this conduit means 17 includes an orifice means 35 as described above, a bypass conduit means 23 also being provided, as described above, so that in this way the liquid and gaseous phases are continuously delivered to the pump means, as described above. The volute liquid outlet of the pump means 18 returns the liquid along a return conduit means 76, through a check valve 77, back to the boiler 70. Conduit means 76 and check valve 77 correspond to conduit 26 and check valve 28 of FIG. 1. A conduit 43' corresponding to the conduit 43 of FIG. 3 serves to direct a portion of the liquid flowing in conduit 76 back to the pump to provide the liquid seal for the first stage of the rotor, as described above. The gas which is discharged from the pump 18 through conduit 25 flows through valve 82 and conduit means 78 to a divided circuit, either to atmosphere through valve 84 or back through recirculating conduit means 83B to the supply conduit means 71 between the heat exchanger 74 and the pressure reducing valve 72, as will later be explained. Condensate in the gas discharge is received in droplets which collect in the chamber 79 and when sufficient liquid is collected in the chamber 79 the float valve assembly 80 will be automatically actuated to deliver the liquid back to the pump to the inlet thereof. A similar chamber 81 and float valve assembly 82 is provided above chamber 79 and float valve assembly 80 and is connected to conduit means 78, but in this case the valve assembly 82 normally will remain open at all times and is provided only for the case where flooding occurs, so that in such an instance the valve 82 will automatically close to prevent any liquid from being delivered to the conduit means 78. The recirculating conduit means 83B includes a check valve 83 which prevents escape of steam from the heating supply conduit 71 to the conduit 78 and valve 84 but opens to allow steam to pass from conduit means 78 through recirculating conduit means 83B into conduit 71 when the pressure in the conduit 78 is about one pound higher than the pressure of the steam discharge from the reducing valve 72. A thermostatic valve means 84 is provided in the conduit means 78 between the check valve 83 and valve assembly 82. Valve 84, normally open will discharge the gas to the outer atmosphere. Thus, during the initial starting up operation, air and other gases which are at a relatively low temperature will be discharged through the conduit means 78 and because of the relatively lower temperature of the mixture, valve 84 will remain open to pass this mixture to atmosphere. The opening of valve 84 also insures that the pressure in recirculating conduit means 83B upstream of check valve 83 is lower than the pressure downstream of check valve 83, which would be at the supply pressure of the pressure reducing valve 72. However, after the apparatus has been operating for a relatively short period of time and the air from the system has been expelled through valve 84, the steam discharged at this time will increase the temperature of the fluid in the conduit 78 upstream of the check valve 83. The valve 84 is so designed that when this increased temperature reaches the saturation temperature of the steam pressure existing at the valve 84, said valve 84 will close.

The closing of valve 84 by this saturation temperature then permits the first stage section of the pump 18 to build up further steam pressure in conduit 78 until this pressure exceeds the pressure in the recirculating conduit means 83B and when a sufficient pressure of steam in the conduit 78 is attained, the check valve 83 will open.

Thus, this feature of the invention automatically provides for recirculation to coil 75 of residual steam from the conduit means 17 by compressing it in the first stage of pump 18 to a pressure sufficiently high to guarantee a temperature and pressure equal to the supply pressure of the heating coil 75.

It wil be noted that with the installation illustrated in FIG. 12 the pump means 18 is ideal for the continuous removal of condensate and non-condensibles from the heat exchanger and provides a positive displacement action to withdraw the non-condensible gases and thus speed up the circulation in the heat exchanger. Moreover, the pump directly removes the condensate and delivers it to the boiler with a minimum temperature drop or heat loss. Conventional pumps require a temperature drop below saturation temperature to permit them to function, plus a submerged head. The pump of the invention is capable of actively pumping boiling water even with only a partially flooded suction. For example, with the embodiments which are shown in FIGS. 6 and 7, the lower lift fitting can be removed, and the bottom end of the lift pipe can simply be inserted into boiling water beneath the surface thereof, and the pump of the invention will pump the boiling water under these conditions. Thus, with the structure of FIG. 12 automatic continuous circulation within the heat exchanger is provided after all non-condensibles have been removed. The relatively positive displacement action of the pump removes air and non-condensibles, and after the non-condensibles are removed, automatic steam compression is provided with auxiliary steam recirculation by returning the steam from the return main back to the supply conduit means. As a result, the arrangement of FIG. 12 will provide more even and continuing distribution of heat throughout the coil, or throughout a jacket or a mold of other installations, with the elimination of a stagnant or "dead" spots, and with a more efficient and higher transfer rate as well as an improved production rate, without waste or loss of steam. The structure of FIG. 12 automatically and continuously removes condensate and non-condensible gas fumes from the interior walls of the heat exchanger.

In FIG. 13 a variation and simplification of FIG. 8 is shown wherein the liquid nozzle does not extend into the pump inlet. The arrangement includes a flow fitting 200 joined by a nipple 202 to the inlet of the pump 18. The opposite end of fitting 200 is connected through a reducer 206 to a typical return conduit 17. The fitting 200 includes an integral restriction or orifice 204 to hold back the liquid and provide the necessary static head to produce the required velocity to jet the liquid directly into the pump inlet ports.

A typical system employing the arrangement of FIG. 13 is shown in FIG. 14. FIG. 14 is similar to FIG. 1 and identical parts having similar functions have been designated with like reference numerals. As may be readily seen, the steam heating system of FIG. 14 has all of the aforementioned advantages of FIG. 1 and in addition includes a drain trap portion 208 and cap 210 so that periodic cleaning and drainage of the entire system may be readily accomplished.

Thus, it is apparent from the above description that with the arrangements and structure of the invention it is possible to very greatly simplify the handling of fluids in both the gaseous and the liquid phases with a great increase of efficiency as compared to conventional systems which are used for this purpose. With respect to comfort heating installations, it becomes possible to use steam, with all of the advantages thereof, such as the very rapid delivery of the heat to a great number of heating units, without, however, the disadvantage resulting from the conventional installations which require start-stop devices necessarily resulting in undesirable fluctuations of temperature, and at the same time the suction produced by the pump will enable the steam to be supplied at a temperature which is sufficiently low for comfort heating purposes, so that with the structure of the invention it does become economically feasible to use steam for relatively small comfort heating purposes, inasmuch as the system is economically as advantageous as any hot water circulating system used for comfort heating purposes. Moreover, in industrial applications, as illustrated in FIG. 12, it is also clear that the invention provides not only an extremely efficient and practical flow of a heating medium through a heat exchanger, but in addition the structure is also quite simple and inexpensive as well as easy to operate and maintain, and in addition there is also provided with FIG. 12 automatic circulation of a part of the heating medium back to the heat exchanger.

While applicant has chosen to describe the invention as employing a liquid ring pump of two lobe design, it should be understood that the number of lobes employed in the vapor compression stage of the pump means 18 may be one or more without departing from the spirit of the invention.

While applicant has chosen to describe the invention as employing a liquid ring pump in stage relationship with a centrifugal pump wherein gases and vapors may be drawn off or discharged at the interstage point, the inlet line devices are equally applicable to similar two stage pumps where all gases and vapors are discharged with the liquid in a common second stage discharge connection. The inlet devices shown may also be utilized to smooth out the flow of any positive displacement pump required to pump a mixture of gas and liquid.

While various embodiments of the invention have been shown and described in detail to illustrate the application of the inventive principles, it should be understood that the invention may be embodied otherwise without departing from such principles.

I claim:

1. A flow control system for directing mixed phase fluids in both liquid and gaseous phases in predetermined ratio to pumping means comprising, in combination, single pump means for pumping fluids in liquid and gaseous phases, said pump means having an inlet and a pair of outlets through which liquids and compressed gases are respectively discharged from said pump means; main conduit means communicating with said inlet of said pump means and being adapted to contain upstream of said pump means fluids in liquid and gaseous phases for directing the fluids toward said inlet of said pump means; orifice means carried by said main conduit means and reducing the cross section thereof for limiting the flow of liquid to said pump means, said orifice means building up a head of liquid on the upstream side of said orifice means, with respect to said inlet of said pump means, so that only liquid flows through said orifice means downstream thereof along said main conduit means toward said inlet of said pump means; whereby said orifice means maintains a substantially continuous flow of liquid to said inlet of said pump means irrespective of variations in the movement of the liquid in said main conduit means upstream of said orifice means; and bypass conduit means communicating with said main conduit means upstream of said orifice means for receiving fluids in the gaseous phase from said main conduit means, said bypass conduit means also communicating with said inlet for delivering thereto the gases received in said bypass conduit means from said main conduit means upstream of said orifice means.

2. In an apparatus as recited in claim 1, said bypass conduit means having a downstream end communicating with said main conduit means downstream of said orifice means so that said bypass conduit means communicates with said pump inlet through a portion of said main conduit means which is located downstream of said orifice means.

3. In an apparatus as recited in claim 1, said orifice means being located at the downstream end of said main conduit means which is located directly at said inlet of said pump means and said bypass conduit means having a downstream end portion surrounding said orifice means and also communicating with said inlet so that the gases surround the liquid entering into the inlet of said pump means.

4. In an apparatus as recited in claim 3, said pump means carrying a stationary deflector means at said inlet thereof for dividing the stream of liquid issuing from said orifice means into stream components which enter into said pump means and which leave unobstructed spaces to be occupied by the gases while they enter into said pump means through said inlet thereof.

5. In an apparatus as recited in claim 3, said orifice means being in the form of an elongated inner tubular portion extending to said inlet of said pump means and said downstream end of said bypass conduit means being in the form of an elongated outer tubular portion extending along and coaxially surrounding said inner tubular portion and being spaced therefrom and also leading to said inlet of said pump means.

6. In an apparatus as recited in claim 5, helix means located in the interior of one of said elongated tubular portions for providing a spiral path of flow for the fluid which flows through said one elongated tubular portion toward said inlet of said pump means.

7. In an apparatus as recited in claim 6 and wherein said helix means is located in the interior of said inner elongated tubular portion and thus provides a spiral path of flow for the liquid.

8. In an apparatus as recited in claim 6 wherein said helix means is located in the interior of said outer tubular portion between the latter and said inner tubular portion providing a spiral path of flow for the gases.

9. In an apparatus as recited in claim 5, said inner tubular portion being formed at its end located at said inlet of said pump means with a plurality of notches which distribute the liquid helically into said inlet of said pump means.

10. In an apparatus as recited in claim 5, said inner tubular portion having at its end located at said inlet of said pump means an inner surface which converges toward said inlet of said pump means to provide a stream of liquid issuing from said inner tubular portion and converging toward said inlet of said pump means as it enters the latter.

11. In an apparatus as recited in claim 1, said main conduit means having upstream of said inlet of said pump means a low portion located at an elevation lower than said inlet of said pump means and said main conduit means having a lifting portion communicating with and extending upwardly from said low portion thereof, said lifting portion of said main conduit means extending to an elevation higher than said inlet of said pump means and said bypass conduit means communicating with said main conduit means at the upstream end of said bypass conduit means at a portion of said conduit means located downstream of said lifting portion thereof, so that the gases rising upwardly through said lifting portion of said main conduit means will raise the liquid upwardly along said lifting portion of said main conduit means before the gases reach the said bypass conduit means.

12. In an apparatus as recited in claim 1, said main conduit means terminating in a liquid chamber and said bypass conduit means terminating in a gas chamber communicating directly with said inlet of said pump means and located between said inlet of said pump means and said liquid chamber, said orifice means being in the form of an elongated nozzle communicating with said liquid chamber and passing through said gas chamber to said inlet of said pump means for directing liquid from said liquid chamber into said pump means.

13. In a comfort heating system, in combination, a heating unit adapted to contain steam; single self-adapted pump means for pumping fluids in both liquid and gaseous phases, said pump means having a single inlet and a pair of outlets for respectively conveying liquids and gases from said pump means; main conduit means leading from said heating unit directly to said inlet of said pump means for directing toward said pump, liquid condensate and gases discharging from said heating unit; orifice means located in said main conduit means for building up a head of liquid therein on the upstream side of said orifice means with respect to said inlet of said pump means, so that a continuous stream of liquid issues from said orifice means toward said inlet of said pump means; and bypass conduit means communicating with said main conduit means upstream of said orifice means, said bypass conduit means also communicating with said inlet of said pump means for directing gases directly to said inlet.

14. In a system as recited in claim 13, separating means communicating with that outlet of said pump means through which the gases discharge for separating additional condensate from the gases which discharge from said pump means, said separating means communicating also with said inlet of said pump means for directing back through said inlet liquids which condense from gases discharged from said pump means.

15. The method of simplifying a conventional steam heating system employing pitched return lines and gravity to direct the system condensate and spent steam vapors to a low point of the heating system and employing a vacuum in the return line to enhance the flow of steam therethrough and control the temperature thereof, comprising the steps of connecting a multi-purpose liquid and vacuum pumping means directly in said return line, and employing the vapor and gases pumped by said pumping means to operate an air-lift to raise the condensate in said return line from its low point to the inlet of said pumping means located substantially above said system low point.

16. In a steam heating system having means for providing steam to a heat exchanger and return lines for removing condensate from the heat exchanger and which employs a vacuum in the return line to augment the flow of steam therethrough and control the temperature thereof, that improvement therein comprising, a multi-purpose liquid and vacuum pumping means directly connected to the return line for simultaneously withdrawing liquids, gases and vapors therefrom, restriction means posiitoned in said return line for providing a head of liquid upstream of the restriction means, and bypass means, one end of which is connected to said return line upstream of the restriction means the other end of which communicates with said pumping means downstream of said restriction means, for providing an unrestricted vapor and gas passage from the upstream to the downstream side of the restriction means in the return line, the output of said restriction means and said bypass means being fed to said pumping means.

17. A system as in claim 16 wherein said pumping means includes input means for directing the liquids, gases and vapors to their respective sections of the pumping means and output means for directing the liquids, gases and vapors to their respective merging points in the system.

18. The method of operating a steam heating system wherein the return line contains condensate and vapor comprising restricting, before the inlet of a liquid vapor phase pump, the flow of condensate to build a liquid head thereby providing a susbtantially constant supply at the pump inlet, withdrawing vapors from above the liquid head and recombining the vapors with the liquid at the pump inlet.

19. In a pipe system for conveying fluids in both liquid and gaseous phases, a main conduit and an orifice means carried by said main conduit for restricting the interior cross sectional area thereof through which fluid can flow, said main conduit having fluids in the liquid and gaseous phase therein upstream of said orifice means and said orifice means building up a head of liquid upstream thereof in said main conduit so that only liquid flows in a steady stream through said orifice means in said main conduit downstream of said orifice means, and a gas conduit communicating with said main conduit upstream of said orifice means for receiving gas therefrom.

20. In a system as recited in claim 19, said gas conduit communicating with said main conduit downstream of said orifice means for redirecting the gas to said main conduit downstream of said orifice means, so that the gas conduit bypasses said orifice means to provide a flow of gas around the latter.

21. In a gravity flow pipe system for conveying fluids in liquid and gaseous phases, a main conduit adapted to carry fluid both in the liquid and in the gaseous phase, said main conduit having an elongated portion of reduced cross section which builds up a head of liquid upstream thereof so that the liquid completely fills said elongated portion of said conduit which is of reduced cross section, a gas conduit communicating with said main conduit upstream of said reduced portion thereof for diverting gas from said main conduit before said head of liquid, and said gas conduit terminating in a tubular portion surrounding said reduced portion of said main conduit so that the gas is returned to said main conduit in a stream which surrounds the liquid phase, said main conduit terminating at the inlet of a pump and introducing said liquid and said returned gas nto said pump inlet.

22. In a system as recited in claim 21, said reduced portion of said main conduit carrying a helix in its interior to provide a whirling flow for the liquid.

23. In a system as recited in claim 21, a helix situated in said tubular portion of said gas conduit surrounding said reduced portion of said main conduit for providing a whirling gas flow.

24. In a system as recited in claim 21, said reduced portion of said main conduit having a free discharge end formed with notches for discharging the liquid helically from said main conduit.

25. In a fluid-conveying system for simultaneously conveying fluid in the gaseous and liquid phases, a container carrying in its interior a partition dividing said container into a liquid chamber on one side of said partition and a gas chamber on the other side of siad partition, said container being formed with a discharge opening communicating with said gas chamber thereof and said partition carrying a nozzle aligned with said discharge opening for directing a jet of liquid from said liquid chamber through said nozzle across said gas chamber and out through said discharge opening, a main conduit adapted to carry fluid in both the liquid and gaseous phase and communicating with said liquid chamber for directing liquid into the latter, said gas chamber communicating with said main conduit for receiving gas therefrom to discharge from said gas chamber in a stream surrounding the jet of liquid issuing from said nozzle.

26. In a system as recited in claim 25, a bypass conduit communicating with said main conduit and with said gas chamber for directing gas to the latter from said main conduit.

27. In a system as recited in claim 25, said partition having an upper portion formed with an opening through which gas issuing from said main conduit into said liquid chamber and situated above said nozzle therein will flow into said gas chamber to discharge from the latter in a stream surrounding the liquid jet.

28. In a heating system, in combination, heat exchanger means; boiler means; supply conduit means communicating with said boiler means and said heat exchanger means for supplying gases from said boiler means to said heat exchanger means to flow therethrough for providing useful heat; pump means having an inlet and a pair of outlets one of which is a liquid outlet through which liquid discharges from said pump means, the other of which is a gas outlet through which gas discharges from said pump means; main conduit means leading from said heat exchanger means to said inlet of said pump means for directing gases and liquid condensate from said heat exchanger means to said inlet of said pump means; orifice means carried by said conduit means for building up a head of liquid on the upstream side of said orifice means with respect to said inlet of said pump means and for providing a continuous flow of liquid through said orifice means to said inlet of said pump means; bypass conduit means communicating with said main conduit means upstream of said orifice means for receiving gas from said main conduit means, said bypass conduit means also communicating with said inlet of said pump means for delivering gases thereto; return conduit means communicating with said liquid outlet of said pump means and with said boiler means for conveying liquid discharged from said pump means back to said boiler means to be heated therein; recirculating conduit means communicating with said gas outlet of said pump means and with said supply conduit means between said boiler means and said heat exchange means for recirculating to the latter hot gas which discharges from said pump means through said gas outlet thereof.

29. The combination as claimed in claim 28, further comprising check valve means located in said recirculating conduit means for preventing gas therein from reaching said supply conduit means, unless the gas in said recirculating conduit means has a pressure greater than the pressure of the gas in said supply conduit means; and thermostatic valve means communicating with said recirculating conduit means at a portion thereof located between said gas outlet of said pump means and said check valve means for discharging gases below a predetermined temperature which flow from said gas outlet of said pump means, said check valve means permitting flow of said gases when the pressure of said gases is great enough to open said check valve means and pass beyond the latter through the portion of said recirculating conduit means located downstream of said check valve means to said supply conduit means.

References Cited by the Examiner
UNITED STATES PATENTS

| | | | |
|---|---|---|---|
| 322,908 | 7/1885 | Corbly | 239—403 |
| 1,044,104 | 11/1912 | Tainter | 239—406 X |
| 1,267,897 | 5/1918 | Pagel | 103—6 |
| 1,413,134 | 4/1922 | Purnell | 239—405 X |
| 1,832,398 | 11/1931 | Jennings | 103—6 |
| 1,901,154 | 3/1933 | Durdin | 103—6 |
| 2,162,952 | 6/1939 | Jennings | 237—9 |
| 2,312,191 | 2/1943 | Reader | 237—9 |
| 2,362,954 | 11/1944 | Adams | 103—6 |
| 2,719,056 | 9/1955 | Bettison | 239—403 X |
| 2,878,063 | 3/1959 | Kish et al. | 239—403 |
| 2,940,657 | 6/1960 | Adams | 230—79 |
| 3,007,322 | 11/1961 | Dodge | 230—95 |
| 3,102,083 | 8/1963 | Adams | 103—6 |

FOREIGN PATENTS

| | | |
|---|---|---|
| 935,843 | 2/1948 | France. |
| 850,469 | 10/1960 | Great Britain. |
| 254,169 | 2/1927 | Italy. |

EDWARD J. MICHAEL, *Primary Examiner.*